(12) United States Patent
He et al.

(10) Patent No.: US 11,977,005 B1
(45) Date of Patent: May 7, 2024

(54) CRACK DETECTION APPARATUS FOR DETECTING BUILDING STRUCTURE

(71) Applicant: Anhui Jianzhu University, Hefei (CN)

(72) Inventors: Wei He, Hefei (CN); Mingqi Peng, Hefei (CN); Rongyao Gong, Hefei (CN); Haizhou Tan, Hefei (CN)

(73) Assignee: Anhui Jianzhu University, Hefei (CN)

( * ) Notice: Subject to any disclaimer, the term of this patent is extended or adjusted under 35 U.S.C. 154(b) by 0 days.

(21) Appl. No.: 18/507,804

(22) Filed: Nov. 13, 2023

Related U.S. Application Data (63) Continuation of application No. PCT/CN2023/116937, filed on Sep. 5, 2023.

(30) Foreign Application Priority Data

Jun. 7, 2023 (CN) .......................... 202310663939.5

(51) Int. Cl.
  *G01M 5/00* (2006.01)
  *B62D 57/024* (2006.01)
(52) U.S. Cl.
  CPC ......... *G01M 5/0033* (2013.01); *B62D 57/024* (2013.01)
(58) Field of Classification Search
  CPC .... G01M 5/0033; G01M 3/002; G01M 7/025; G01M 5/0008; B62D 57/024; G01N 29/045; G01N 27/83; G01N 27/20; G01N 21/952; G01N 29/4472; G01B 11/02
  See application file for complete search history.

(56) References Cited

FOREIGN PATENT DOCUMENTS

| CN | 104058020 | A |   | 9/2014 |   |
|----|-----------|---|---|--------|---|
| CN | 203902717 | U | * | 10/2014 |  |
| CN | 104875810 | A |   | 9/2015 |   |
| CN | 105416431 | A |   | 3/2016 |   |
| CN | 110228544 | A | * | 9/2019 | ........... B62D 57/024 |
| CN | 110228544 | A |   | 9/2019 |   |
| CN | 116395053 | B | * | 8/2023 |   |
| JP | H05213241 | A |   | 8/1993 |   |
| JP | 5828973   | B1 |  | 12/2015 |  |

* cited by examiner

*Primary Examiner* — Brandi N Hopkins
(74) *Attorney, Agent, or Firm* — Westbridge IP LLC (57) ABSTRACT

Disclosed is a crack detection apparatus for detecting a building structure, belonging to the technical field of building detection and including a main shaft collar, an auxiliary shaft collar, a rotating drum, a bracket assembly, a crawling mechanism and a transmission assembly, where the main shaft collar is rotationally connected with the auxiliary shaft collar, main slewing arms and auxiliary slewing arms that are in X-shaped crossing are arranged on the main shaft collar and the auxiliary shaft collar, the rotating drum swinging back and forth is rotationally assembled on the main shaft collar, a tail end of the rotating drum is provided with a cleaning arm, the crawling mechanism is assembled at tail ends of the main slewing arms and the auxiliary slewing arms and connected with the rotating drum through the transmission assembly.

9 Claims, 5 Drawing Sheets

CRACK DETECTION APPARATUS FOR DETECTING BUILDING STRUCTURE

CROSS-REFERENCE TO RELATED APPLICATIONS

This application is a continuation of International Application No. PCT/CN2023/116937, filed on Sep. 5, 2023, which claims priority to Chinese Patent Application No. 202310663939.5, filed on Jun. 7, 2023. All of the aforementioned applications are incorporated herein by reference in their entireties.

TECHNICAL FIELD

The present disclosure belongs to the technical field of structure detection, and particularly relates to a crack detection apparatus for detecting a building structure.

BACKGROUND

After the completion of the construction, due to the existence of factors such as human and environment affecting the structure and quality of a building, it is necessary to detect and identify the quality of a construction engineering, which can improve the quality and safety level of the building to a large extent. A targeted solution may be granted according to various quality problems arising from the building, to effectively prolong the service life of the building.

A great change in the temperature will affect a probability that a building structure occurs a crack, different materials process different representations at a temperature change, which may allow the building structure to appear a greater change even produce a structural crack, thereby affecting an integrity of a house.

When an outer wall surface of the building structure is subjected to crack detection, at present, most of the existing devices perform inspection by hoisting a bracket at a top of the building and operating the device artificially. Due to a limited transverse movement distance of the hoisting bracket, it is necessary to move a position of a top crane several times to complete the detection of the whole wall, moreover the outer wall surface of many building structures will adopt a beautifying process with a concave-convex masonry, such that the hoisting bracket with a fixed size is hard to perform an operation, and a hoisting device is also prone to shaking and exits a risk of falling in a windy weather.

SUMMARY

For deficiencies existing in the prior art, the objective of embodiments of the present disclosure is to provide a crack detection apparatus for detecting a building structure, to solve the problem in the foregoing background art.

In order to implement the foregoing objective, the present disclosure adopts the technical solution below:

a crack detection apparatus for detecting a building structure includes a rack member, where the rack member includes a main shaft collar, main slewing arms, an auxiliary shaft collar and auxiliary slewing arms, two groups of main slewing arms are arranged on the main shaft collar in a circumferential direction, an inner toothed ring is arranged on an inner diameter of the main shaft collar, the auxiliary shaft collar is rotationally sleeved on the main shaft collar, two groups of auxiliary slewing arms are arranged on the auxiliary shaft collar in a circumferential direction, and the main slewing arms and the auxiliary slewing arms are located in a same plane and present an X-shaped structural setting;

a swing rod assembly, where the swing rod assembly includes a rotating drum, a main drive motor, a driven gear, a sliding rod, a cleaning arm and a double-sided brush head, the rotating drum is rotationally assembled on the main shaft collar, the sliding rod is slidingly assembled at a top of the rotating drum, in which the main drive motor is assembled, one end of the main drive motor is in assembly connection with a main gear, the driven gear is arranged at one end of the rotating drum, one end of the driven gear is in transmission connection with the main gear while the other end is meshing connection with the inner toothed ring, the other end of the rotating drum is also provided with the cleaning arm, in which an auxiliary moving shaft is rotationally assembled, and one end of the auxiliary moving shaft is in transmission connection with the main gear while the other end is in assembly connection with the double-sided brush head;

a bracket assembly, where the bracket assembly is rotationally assembled on the sliding rod, and both ends of the bracket assembly are movably connected with the adjacent main slewing arms and auxiliary slewing arms, respectively;

a crawling mechanism, where the crawling mechanism includes a housing, a transverse guide slot, a moving rack, a rotating shaft, a lateral guide slot, a crimping wheel and a hinging rack, one end of the housing is fixedly connected with the hinging rack, and the housing is rotationally assembled at tail ends of the main slewing arm and the auxiliary slewing arm through the hinging rack, the transverse guide slot is arranged on two parallel end faces of the housing, the lateral guide slot is arranged on another two parallel end faces of the housing, the moving rack is elastically and slidingly assembled in the transverse guide slot, the rotating shaft is rotationally assembled on the moving rack, and the crimping wheel is fixedly assembled on the rotating shaft and movably arranged in the lateral guide slot; and a transmission assembly, where the transmission assembly includes a first link arm, a first link, a second link arm and a second link, the first link arm is rotationally sleeved at a tail end of the rotating shaft, the first link is rotationally assembled on the first link arm, the second link is rotationally assembled on the main slewing arm and the auxiliary slewing arm, one end of the second link arm is rotationally sleeved on the first link while the other end is rotationally sleeved on the second link, the first link arm is also provided with a first synchronous belt group, which is in transmission connection with the rotating shaft and the first link, a second synchronous belt group is also arranged between the first link and the second link and in transmission connection with the first link and the second link, and the second link is in transmission connection with the main drive motor.

As a further solution of the present disclosure, the rack member further includes linkage gears, the swing rod assembly further includes a transmission plate, the linkage gears are rotationally assembled on the main slewing arms and the auxiliary slewing arms and arranged proximally to one end of the main shaft collar and one end of the auxiliary shaft collar, the transmission plate is fixedly assembled at one end of the rotating drum, a plurality of elastic ratchet sheets are arranged on the transmission plate in a circumferential direction, and the elastic ratchet sheets are in meshing connection with a plurality of linkage gears.

As a further solution of the present disclosure, the transmission assembly further includes a third synchronous belt group, which is arranged between the second link and the linkage gears and configured to be in transmission connection with the linkage gears and the second link.

As a further solution of the present disclosure, the swing rod assembly further includes an electrode rod, a middle-facing electrode sheet and a switching motor sheet, the electrode rod is assembled at one end of the rotating drum elastically and slidingly and connected with the middle-facing electrode sheet, both ends of the middle-facing electrode sheet are provided with the switching motor sheet, and both the middle-facing electrode sheet and the switching motor sheet are electrically connected with the main drive motor, to control a rotating direction of the main drive motor.

As a further solution of the present disclosure, the bracket assembly includes a bracket body, a slideway, an upper sliding rod and a lower sliding rod, the bracket body is rotationally assembled at a tail end of the sliding rod, the slideway is arranged on the bracket body, the upper sliding rod and the lower sliding rod are slidingly assembled in the slideway, a bottom of the upper sliding rod is provided with an upper limiting body, a top of the lower sliding rod is provided with a lower limiting body, the upper limiting body is slidingly assembled in the lower limiting body, and the bracket body is also slidingly assembled with a detection device bracket.

As a further solution of the present disclosure, the bracket assembly further includes transverse notches and transverse keys, both ends of the slideway are provided with the transverse notches, and both the upper sliding rod and the lower sliding rod are provided with the transverse keys, which are limited and slidingly assembled in the transverse notches.

As a further solution of the present disclosure, the crawling mechanism further includes a rack, a transmission worm, a transmission worm gear and deflection rollers, the rack is fixedly arranged at one end of the moving rack, the transmission worm is rotationally assembled in the housing, one end of the transmission worm is in meshing connection with the rack while the other end is in meshing connection with the transmission worm gear, the transmission worm gear is rotationally assembled in the housing and both ends thereof are in assembly connection with the deflection rollers, and the deflection rollers are configured to prop the wall of the building structure in a rolling manner.

As a further solution of the present disclosure, the crawling mechanism further includes an auxiliary drive motor, a limiting wheel rod and a limiting strip rod, the auxiliary drive motor is assembled at one end of the moving rack and in transmission connection with the rotating shaft, the limiting wheel rod is slidingly and rotationally assembled on the housing to prop the wall of the building structure in a rolling manner, and the limiting strip rod is slidingly assembled in the hinging rack to limit a rotating trajectory of two groups of housings on a same side.

As a further solution of the present disclosure, the crack detection apparatus for detecting the building structure further includes a locking assembly, where the locking assembly includes arc-shaped arms, an arc-shaped arm limiter and a locking head, both two groups of arc-shaped arms are assembled on the adjacent main slewing arms and the auxiliary slewing arms in respective and slidingly assembled in the arc-shaped arm limiter, and one end of the arc-shaped arm limiter is also provided with the locking head, which is configured to movably lock the two groups of arc-shaped arms.

In conclusion, compared with the prior art, the embodiments of the present disclosure have the following beneficial effects:

The crack detection apparatus provided by the present disclosure can fit with different widths of concave masonry, convex masonry or column building structures for crack detection by rotating the connected main shaft collar and auxiliary shaft collar as well as the main slewing arms and auxiliary slewing arms that are on the main shaft collar and auxiliary shaft collar and present the X-shaped structure, and can fit with a plurality of crawling mechanisms to implement device self-walking and fixed trajectory detection. Compared with the conventional hoisting detection device, the present disclosure has excellent flexibility, and at the same time can eliminate the floating ash on the wall and prevent a covering seam affecting the device detection.

DETAILED DESCRIPTION OF THE EMBODIMENTS

To clearly elaborate the structural features and functions of the present disclosure, the present disclosure is described in detail below in combination with drawings and specific embodiments.

Please refer to FIGS. 1-9, a crack detection apparatus for detecting a building structure provided by one embodiment of the present disclosure includes a rack member 1, a swing rod assembly 2, a bracket assembly 3, a clawing mechanism 4 and a transmission assembly 5, where the rack member 1 includes a main shaft collar 101, main slewing arms 102, an auxiliary shaft collar 104 and auxiliary slewing arms 105, two groups of main slewing arms 102 are arranged on the main shaft collar 101 in a circumferential direction, an inner toothed ring 103 is arranged on an inner diameter of the main shaft collar 101, the auxiliary shaft collar 104 is rotationally sleeved on the main shaft collar 101, two groups of auxiliary slewing arms 105 are arranged on the auxiliary shaft collar 104 in a circumferential direction, and the main slewing arms 102 and the auxiliary slewing arms 105 are located in a same plane and present an X-shaped structural setting.

The swing rod assembly 2 includes a rotating drum 201, a main drive motor 202, a driven gear 204, a sliding rod 205, an electrode rod 206, a middle-facing electrode sheet 207, a switching motor sheet 208, a cleaning arm 209 and a double-sided brush head 211, the rotating drum 201 is rotationally assembled on the main shaft collar 101, the sliding rod 205 is slidingly assembled at a top of the rotating drum 201, the electrode rod 206 is assembled at one end of the rotating drum 201 elastically and slidingly and connected with the middle-facing electrode sheet 207, both ends of the middle-facing electrode sheet 207 are provided with the switching motor sheet 208, both the middle-facing electrode sheet 207 and the switching motor sheet 208 are electrically connected with the main drive motor 202, to control the rotating direction of the main drive motor 202, the main drive motor 202 is assembled in the rotating drum 201, one end of the main drive motor 202 is in assembly connection with a main gear 203, the driven gear 204 is arranged at one end of the rotating drum 201, one end of the driven gear 204 is in transmission connection with the main gear 203 while the other end is meshing connection with the inner toothed ring 103, the other end of the rotating drum 201 is also provided with the cleaning arm 209, in which an auxiliary moving shaft 210 is rotationally assembled, and one end of the auxiliary moving shaft 210 is in transmission connection with the main gear 203 while the other end is in assembly connection with the double-sided brush head 211; the bracket assembly 3 is rotationally assembled on the sliding rod 205, and both ends of the bracket assembly 3 are movably connected with the adjacent main slewing arms 102 and auxiliary slewing arms 105, respectively.

The crawling mechanism 4 includes a housing 401, a transverse guide slot 402, a moving rack 403, a rotating shaft 404, a lateral guide slot 405, a crimping wheel 406 and a hinging rack 412, one end of the housing 401 is fixedly connected with the hinging rack 412, and the housing 401 is rotationally assembled at tail ends of the main slewing arm 102 and the auxiliary slewing arm 105 through the hinging rack 412, the transverse guide slot 402 is arranged on two parallel end faces of the housing 401, the lateral guide slot 405 is arranged on another two parallel end faces of the housing 401, the moving rack 403 is elastically and slidingly assembled in the transverse guide slot 402, the rotating shaft 404 is rotationally assembled on the moving rack 403, and the crimping wheel 406 is fixedly assembled on the rotating shaft 404 and movably arranged in the lateral guide slot 405.

The transmission assembly 5 includes a first link arm 501, a first link 502, a second link arm 503 and a second link 504, the first link arm 501 is rotationally sleeved at a tail end of the rotating shaft 404, the first link 502 is rotationally assembled on the first link arm 501, the second link 504 is rotationally assembled on the main slewing arm 102 and the auxiliary slewing arm 105, one end of the second link arm 503 is rotationally sleeved on the first link 502 while the other end is rotationally sleeved on the second link 504, the first link arm 501 is also provided with a first synchronous belt group 505, which is in transmission connection with the rotating shaft 404 and the first link 502, a second synchronous belt group 506 is also arranged between the first link 502 and the second link 504 and in transmission connection with the first link 502 and the second link 504, and the second link 504 is in transmission connection with the main drive motor 202.

In an actual application of this embodiment, when the detection apparatus for the building structure is used for crack detection, a width of a convex masonry, a concave masonry or a column of the building structure wall is calculated firstly during usage, then the auxiliary shaft collar 104 on the main shaft collar 101 is rotated, such that when the auxiliary shaft collar 104 rotates on the main shaft collar 101, a spacing between the X-shaped main slewing arms 102 and the auxiliary slewing arms 105 is adjustable after rotating, and then the whole width of the apparatus can be adjusted to fit with different widths of convex masonry, concave masonry or column, for example, when moving in the concave masonry, four groups of housings 401 located on sides of the tail ends of the main slewing arms 102 and the auxiliary slewing arms 105 are all crimped on the wall face, since the moving rack 403 is elastically and slidingly assembled in the transverse guide slot 402, the crimping wheel 406 assembled on the rotating shaft 404 is elastically crimped at the wall end, and the other end of the rotating shaft 404 is rotationally sleeved with a first link arm 501.

The first link arm 501, the first link 502, the second link arm 503 and the second link 504 are in transmission connection through a first synchronous belt group 505 and a second synchronous belt group 506, the second link 504 is in transmission connection with the main drive motor 202, so when the main drive motor 202 drives a plurality of second links 504 to rotate synchronously, a plurality of rotating shafts 404 are synchronously driven to rotate in a same direction through the second synchronous belt group 506 and the first synchronous belt group 505, and a plurality of crimping wheels 406 are driven to rotate in a same direction through the rotating shafts 404, so that the apparatus slides directionally between the walls. During a driving process, the main drive motor 202 may drive the main gears 203 thereon to rotate directionally, the main gears 203 mesh with and drive the driven gear 204 to rotate during rotation, since the driven gear 204 is in meshing connection with the inner toothed ring 103, the entire rotating drum 201 can rotate on the main shaft collar 101, when the electrode rod 206 at one end of the rotating drum 201 is close to one side of the adjacent main slewing arm 102, the electrode rod 206 is crimped on the main slewing arm 102 so as to drive the electrode rod 206 to slide with an auxiliary elastic force, and the middle-facing electrode sheet 207 at one end thereof is elastically crimped on the switching motor sheet 208 on the other side; when the middle-facing electrode sheet 207 is crimped on the switching motor sheet 208 on the other side, a current direction of the main drive motor 202 is changed, thus the main drive motor 202 is driven to rotate reversely, the main gear 203 drives the driven gear 204 to rotate reversely and the entire rotating drum 201 rotates reversely.

After rotating towards one end of the auxiliary slewing arm 105, when the electrode rod 206 is crimped on the auxiliary slewing arm 105, the foregoing working process may be repeated to move back and forth, thus the entire rotating drum 201 swings back and forth on the main shaft collar 101 and the bracket assembly 3 assembled on the sliding rod 205 may fit with the detection device assembled thereon to perform reciprocating detection on the wall, meanwhile during a reciprocating swing process, the rotating drum 201 may also drive the auxiliary moving shaft 210 in transmission connection with the main gear 203 to rotate, thus when the cleaning arm 209 swings back and forth, the double-sided brush head 211 on the side of the tail end thereof can rotate continuously and clean the floating ash and impurities on the wall, and some fine cracks are avoided being covered by dust to affect the detection effect; and the detection apparatus can be positively supported in the concave masonry or clamped on the convex masonry or column after being turned over, and then the operation process on the convex masonry, the concave masonry or the column may be implemented, at the same time the effective working width thereof can be adjusted quickly, and the reciprocating coverage detection and ash-cleaning process may be implemented in combination with the reciprocating swing structure, to greatly improve the crack detection efficiency.

In one situation of this embodiment, the apparatus may be used in combination with an ultrasonic detection device or a CCD (Charge Coupled Device) camera detection device, and a specific limitation to the type of the detection apparatus is not made herein.

Figure 3:
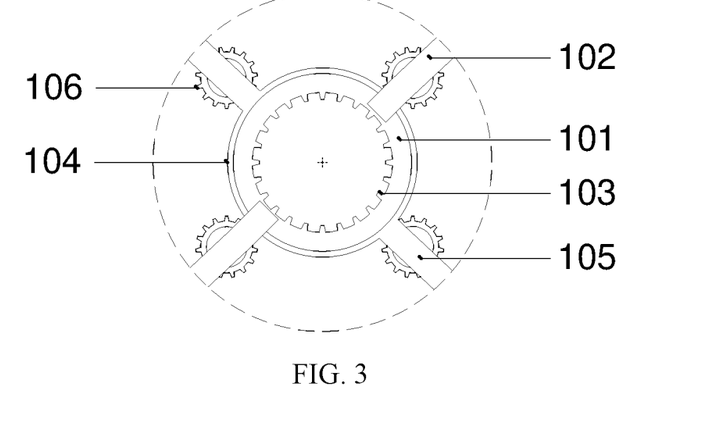
FIG. 3 is a structure schematic diagram of a main shaft collar and an auxiliary shaft collar in a crack detection apparatus for detecting a building structure provided by one embodiment of the present disclosure.
Figure 4:
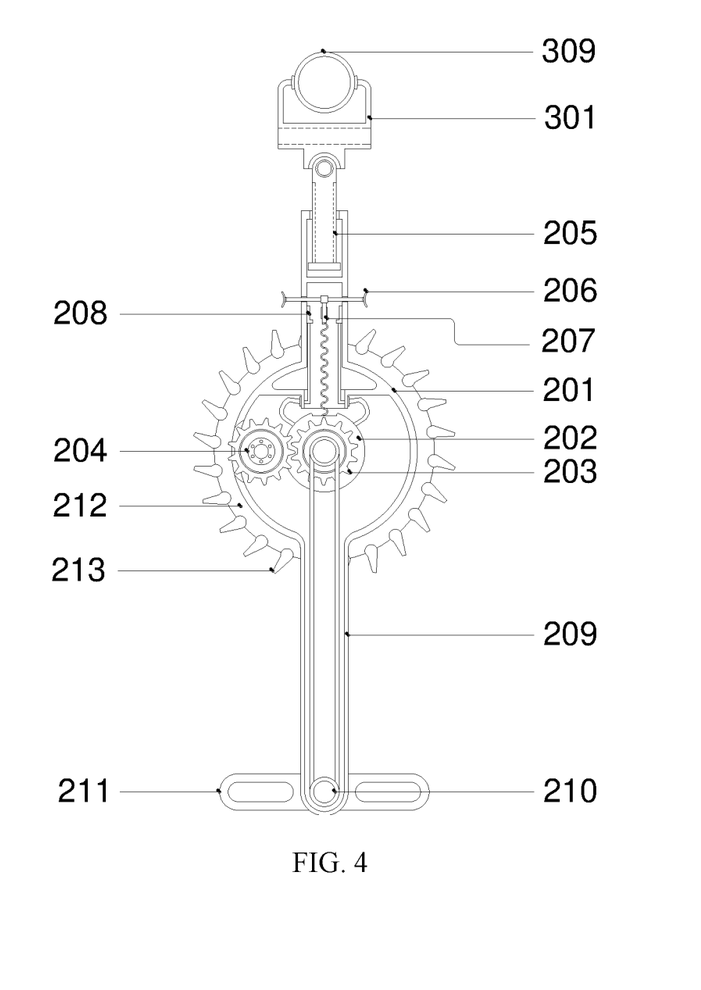
FIG. 4 is a structure schematic diagram of a swing rod assembly of a crack detection apparatus for detecting a building structure provided by one embodiment of the present disclosure.
Figure 5:
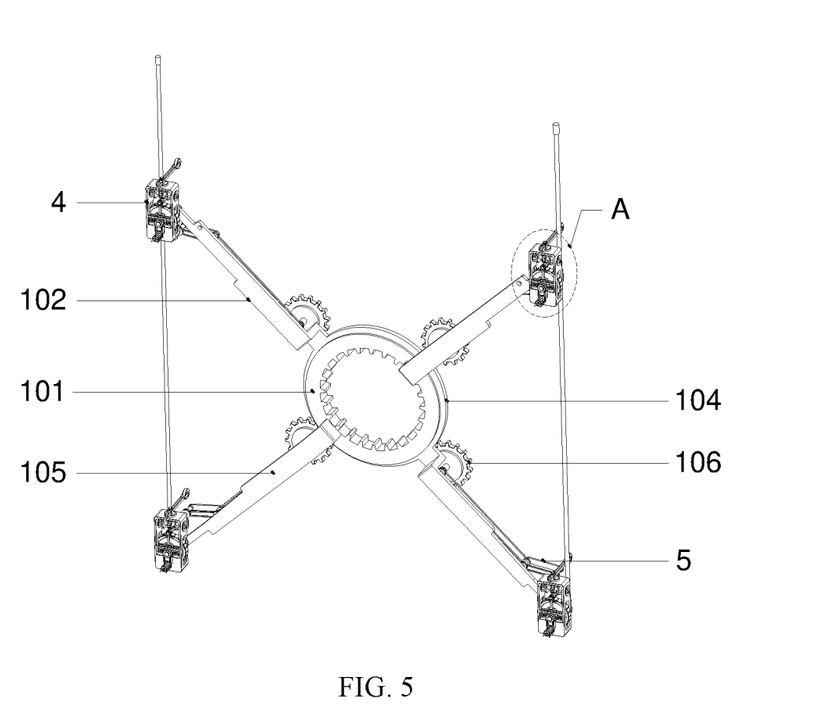
FIG. 5 is a schematic diagram of a front solid structure of a rack member in a crack detection apparatus for detecting a building structure provided by one embodiment of the present disclosure.

Please refer to FIG. 3 and FIG. 4, in one preferred embodiment of the present disclosure, the rack member 1 further includes linkage gears 106, the swing rod assembly 2 further includes a transmission plate 212, the linkage gears 106 are rotationally assembled on the main slewing arms 102 and the auxiliary slewing arms 105 and arranged proximally to one end of the main shaft collar 101 and one end of the auxiliary shaft collar 104, the transmission plate 212 is fixedly assembled at one end of the rotating drum 201, a plurality of elastic ratchet sheets 213 are arranged on the transmission plate 212 in a circumferential direction, and the elastic ratchet sheets 213 are in meshing connection with a plurality of linkage gears 106.

In an actual application of this embodiment, during rotation of the rotating drum 201, the transmission plate 212 on one side thereof may rotate back and forth along with the rotating drum 201, and the elastic ratchet sheet 213 on the transmission plate 212 is meshing connection with a plurality of linkage gears 106, for example, when the transmission plate 212 rotates clockwise, the elastic ratchet sheet 213 is not driven with the plurality of linkage gears 106, at this time the bracket assembly 3 assembled at one end of the rotating drum 201 may drive the detection device thereon to make a transverse horizontal movement and implement the detection process; when the transmission plate 212 rotates anti-clockwise, the plurality of linkage gears 106 in meshing connection with the elastic ratchet sheet 213 rotate simultaneously and drive the second link 504 to rotate synchronously, the rotating shaft 404 in transmission connection with the second link 504 can simultaneously drive the plurality of crimping wheels 406 to rotate in the same direction, such that the apparatus moves a fixed distance directionally at the wall end, and the detection device moves longitudinally, thus the detection action may be implemented in combination with continuous swing, and defaulted to move vertical downward along the wall.

In one situation of this embodiment, since the first link arm 501, the first link 502, the second link arm 503 and the second link 504 are rotationally connected and driven through the first synchronous belt group 505 and the second synchronous belt group 506 thereon, when the housing 401 rotates at the tail ends of the main slewing arm 102 and the auxiliary slewing arm 105, the first link arm 501, the first link 502, the second link arm 503 and the second link rod 504 can ensure the continuous connection of the transmission structure, such that the rotation of the main drive motor 202 may drive the plurality of crimping wheels 406 to move synchronously.

Figure 8:
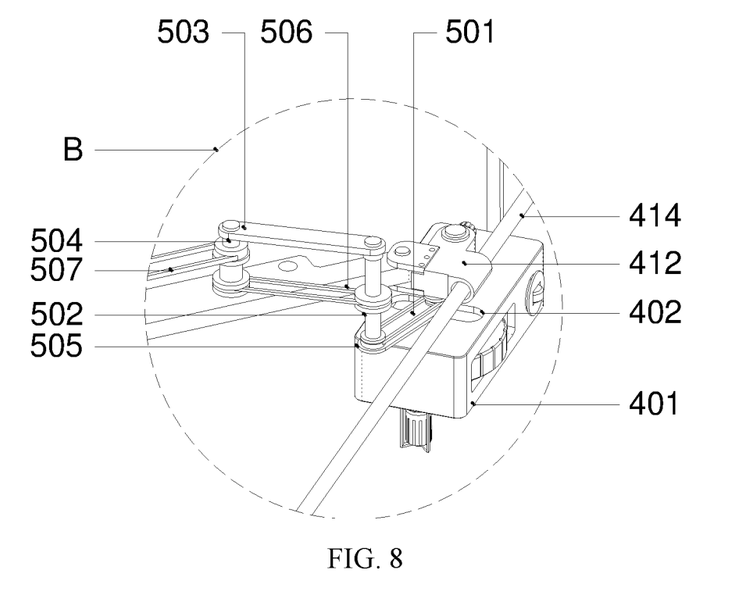
FIG. 8 is an enlarged schematic diagram of a reference sign B in FIG. 7.

Please refer to FIG. 8, in one preferred embodiment of the present disclosure, the transmission assembly 5 further includes a third synchronous belt group 507, which is arranged between the second link 504 and the linkage gears 106 and configured to be in transmission connection with the linkage gears 106 and the second link 504.

In an actual application of this embodiment, the third synchronous belt group 507 is linked with the linkage gears 106 and the second link 504, to achieve that all the crimping wheels 406 in the plurality of housings 401 are in transmission connection with the main drive motor 202.

Figure 9:
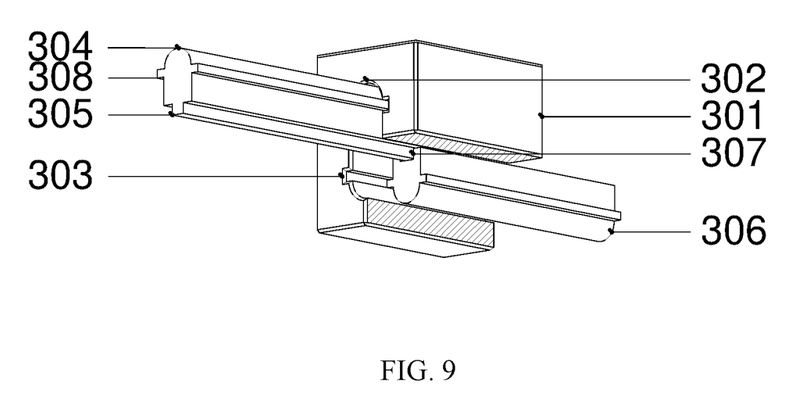
FIG. 9 is a part sectioned view of a bracket assembly in a crack detection apparatus for detecting a building structure provided by one embodiment of the present disclosure.

Please refer to FIG. 9, in one preferred embodiment of the present disclosure, the bracket assembly 3 includes a bracket body 301, a slideway 302, an upper sliding rod 304 and a lower sliding rod 306, the bracket body 301 is rotationally assembled at a tail end of the sliding rod 205, the slideway 302 is arranged on the bracket body 301, the upper sliding rod 304 and the lower sliding rod 306 are slidingly assembled in the slideway 302, a bottom of the upper sliding rod 304 is provided with an upper limiting body 305, a top of the lower sliding rod 306 is provided with a lower limiting body 307, the upper limiting body 305 is slidingly assembled in the lower limiting body 307, and the bracket body 301 is also slidingly assembled with a detection device bracket 309.

In an actual application of this embodiment, both ends of the upper sliding rod 304 and the lower sliding rod 306 are rotationally connected with the main slewing arm 102 and the auxiliary slewing arm 105 in respective, and both the upper sliding rod 304 and the lower sliding rod 306 are limited and slidingly assembled in the slideway 302; the bracket body 301 is rotationally assembled at the tail end of the sliding rod 205, when the auxiliary shaft collar 104 rotates on the main shaft collar 101, the spacing between the main slewing arm 102 and the auxiliary slewing arm 105 is changed along the rotating angle between the auxiliary shaft collar 104 and the main shaft ring 101. Since the upper sliding rod 304 and the lower sliding rod 306 are rotationally connected with end parts of the main slewing arm 102 and the auxiliary slewing arm 105 and limited and slidingly assembled in the slideway 302, the length thereof may change along the rotation of the main slewing arm 102 and the auxiliary slewing arm 105, meanwhile the bracket body 301 may slide back and forth on the upper sliding rod 304 and the lower sliding rod 306, such that the detection device bracket 309 assembled thereon linearly moves back and forth, thereby completely sweeping the wall surface and implementing the crack detection.

In one preferred embodiment of the present disclosure, the bracket assembly 3 further includes transverse notches 303 and transverse keys 308, both ends of the slideway 302 are provided with the transverse notches 303, and both the upper sliding rod 304 and the lower sliding rod 306 are provided with the transverse keys 308, which are limited and slidingly assembled in the transverse notches 303, to prevent the upper sliding rod 304 and the lower sliding rod 306 from misplacing and shaking during a sliding process.

Figure 6:
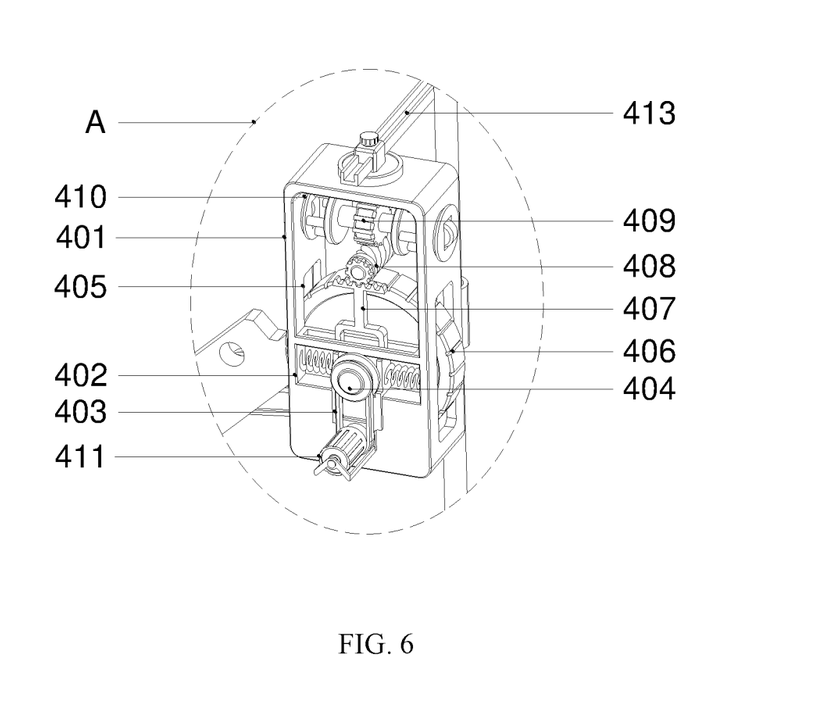
FIG. 6 is an enlarged schematic diagram of a reference sign A in FIG. 5.
Figure 7:
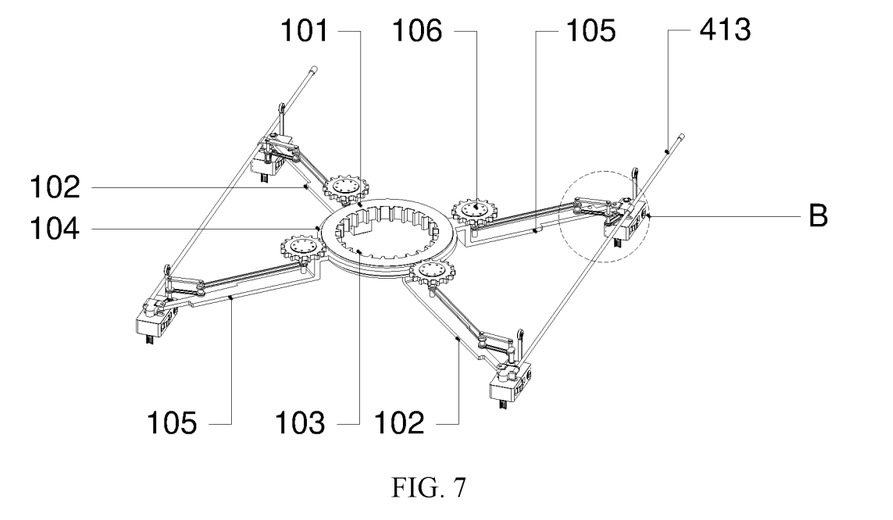
FIG. 7 is a schematic diagram of a back solid structure of a rack member in a crack detection apparatus for detecting a building structure provided by one embodiment of the present disclosure.

Please refer to FIG. 6, in one preferred embodiment of the present disclosure, the crawling mechanism 4 further includes a rack 407, a transmission worm 408, a transmission worm gear 409 and deflection rollers 410, the rack 407 is fixedly arranged at one end of the moving rack 403, the transmission worm 408 is rotationally assembled in the housing 401, one end of the transmission worm 408 is in meshing connection with the rack 407 while the other end is in meshing connection with the transmission worm gear 409, the transmission worm gear 409 is rotationally assembled in the housing 401 and both ends thereof are in assembly connection with the deflection rollers 410, and the deflection rollers 410 are configured to prop the wall of the building structure in a rolling manner.

In an actual application of this embodiment, when the crimping wheels 406 are crimped at the wall end, the moving rack 403 may be driven to slide away from one side of the wall in the transverse guide slot 402, such that the rack 407 may drive the transmission worm 408 to rotate, moreover when the transmission worm gear 409 in meshing connection with the transmission worm 408 rotates, the deflection rollers 410 at the tail end thereof may be driven to deflect, thus when the deflection rollers 410 are propped to the wall to roll, the housing 401 may generate a transverse deflection action during the sliding process of the crimping wheels 406, for example, when moving in the concave masonry, the housing 401 may slide inside the concave masonry, to prevent the apparatus sliding out of the concave masonry during movement. When the apparatus is turned over and clamped on the convex masonry or the column, the apparatus may slide towards the masonry while clamping the masonry, to prevent the apparatus separating from the masonry, and the frictional force between the deflection rollers 410 and the wall is negligible.

In this embodiment, the transmission worm 408 adopts a combined structure of the worm and the gear, and a split repetition is not made herein.

Please refer to FIG. 8, in one preferred embodiment of the present disclosure, the crawling mechanism 4 further includes an auxiliary drive motor 411, a limiting wheel rod 413 and a limiting strip rod 414, the auxiliary drive motor 411 is assembled at one end of the moving rack 403 and in transmission connection with the rotating shaft 404, the limiting wheel rod 413 is slidingly and rotationally assembled on the housing 401 to prop the wall of the building structure in a rolling manner, and the limiting strip rod 414 is slidingly assembled in the hinging rack 412 to limit a rotating trajectory of two groups of housings 401 on a same side.

In an actual application of this embodiment, since only a one-way transmission structure is between the main drive motor 202 and the rotating shaft 404, the auxiliary drive motor 411 is independently arranged on the plurality of moving racks 403 and in transmission connection with the rotating shaft 404, to independently drive the plurality of crimping wheels 406 to rotate reversely, such that the detection apparatus can move reversely on the masonry without the drive of the main drive motor 202. The limiting wheel rod 413 is slidingly assembled on the housing 401, so when the concave masonry or the convex masonry moves, the distance between the apparatus and the wall may be controlled, and thus the detection device is adjusted to the setting work scope.

In this embodiment, a bottom of the limiting strip rod 414 is defaulted to be fixedly assembled in two groups of hinging racks 412 at the bottom, and a top is slidingly assembled in two groups of hinging racks 412 at the top, such that the four groups of housings 401 may keep moving in a posture horizontal with the masonry.

Figure 1:
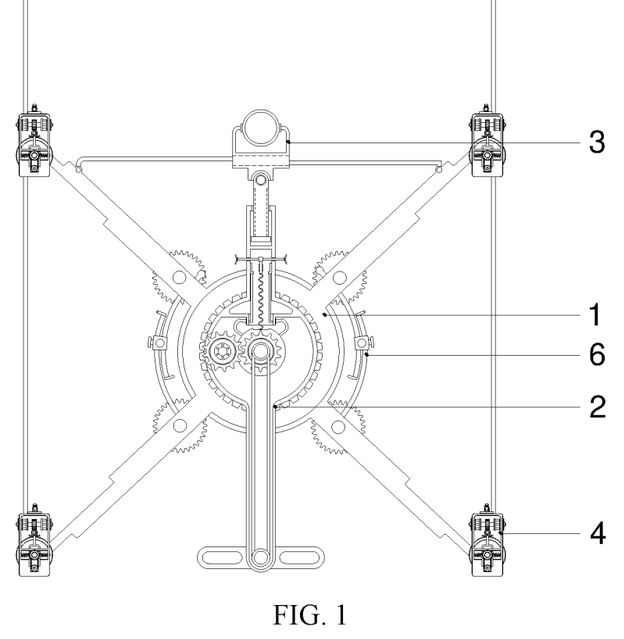
FIG. 1 is a schematic diagram of a crack detection apparatus for detecting a building structure provided by one embodiment of the present disclosure.
Figure 2:
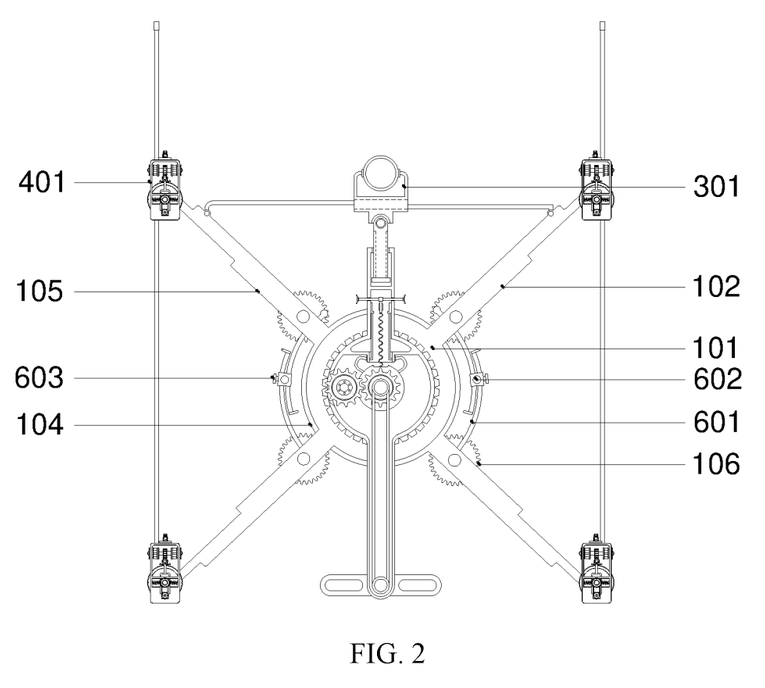
FIG. 2 is a structure schematic diagram of a crack detection apparatus for detecting a building structure provided by one embodiment of the present disclosure.

Please refer to FIG. 2, in one preferred embodiment of the present disclosure, the crack detection apparatus for detecting the building structure further includes a locking assembly 6, where the locking assembly 6 includes arc-shaped arms 601, an arc-shaped arm limiter 602 and a locking head 603, both two groups of arc-shaped arms 601 are assembled on the adjacent main slewing arm 102 and the auxiliary slewing arm 105 in respective and slidingly assembled in the arc-shaped arm limiter 602, and one end of the arc-shaped arm limiter 602 is also provided with the locking head 603, which is configured to movably lock the two groups of arc-shaped arms 601.

In an actual application of this embodiment, two arc-shaped arms 601 on the main slewing arm 102 and the auxiliary slewing arm 105 are slidingly arranged in the arc-shaped arm limiter 602, when the auxiliary shaft collar 104 rotates on the main shaft collar 101, the main slewing arm 102 and the auxiliary slewing arm 105 on the adjacent side may be close to or away from each other, the two groups of arc-shaped arms 601 assembled at one end thereof may slide directionally in the arc-shaped arm limiter 602, and the locking head 603 at one end of the arc-shaped arm limiter 602 may lock the arc-shaped arm 601, such that the transverse arm width of the apparatus keeps stationary.

In one situation of this embodiment, the arc-shaped arm limiter 602 may also be in meshing connection with the two groups of arc-shaped arm 601 by equipping an external motor, to drive the directional sliding of the two groups of arc-shaped arms 601 and adjust the deflection angle between the main shaft collar 101 and the auxiliary shaft collar 104, and a specific repetition is not made herein.

The foregoing embodiments of the present disclosure provide a crack detection apparatus for detecting a building structure, by rotating the connected main shaft collar 101 and the auxiliary shaft collar 104 as well as the main slewing arms 102 and the auxiliary slewing arms 105 that are on the main shaft collar 101 and the auxiliary shaft collar 104 and present the X-shaped structure, the crack detection apparatus can fit with different widths of concave masonry, convex masonry or column building structures for rack detection, and the device self-walking and fixed trajectory detection may be implemented by the rotating drums 201 swinging back and forth therein and in combination with a plurality of crawling mechanisms 4. Compared with the conventional hoisting detection device, the present disclosure has excellent flexibility, and can eliminate the floating ash on the wall and prevent a covering seam affecting the device detection.

The above are only optional embodiments of the present disclosure and not intended to limit the present disclosure. Any modifications, equivalent replacements, improvements and the like made within the spirit and principle of the present disclosure shall fall within the protection scope of the present disclosure.

What is claimed is:

1. A crack detection apparatus for detecting a building structure, comprising:
 a rack member, wherein the rack member comprises a main shaft collar, main slewing arms, an auxiliary shaft collar and auxiliary slewing arms, two groups of main slewing arms are arranged on the main shaft collar in a circumferential direction, an inner toothed ring is arranged on an inner diameter of the main shaft collar, the auxiliary shaft collar is rotationally sleeved on the main shaft collar, two groups of auxiliary slewing arms are arranged on the auxiliary shaft collar in a circumferential direction, and the main slewing arms and the auxiliary slewing arms are located in a same plane and present an X-shaped structural setting;
 a swing rod assembly, wherein the swing rod assembly comprises a rotating drum, a main drive motor, a driven gear, a sliding rod, a cleaning arm and a double-sided brush head, the rotating drum is rotationally assembled on the main shaft collar, the sliding rod is slidingly assembled at a top of the rotating drum, in which the main drive motor is assembled, one end of the main drive motor is in assembly connection with a main gear, the driven gear is arranged at one end of the rotating drum, one end of the driven gear is in transmission connection with the main gear while the other end is meshing connection with the inner toothed ring, the other end of the rotating drum is also provided with the cleaning arm, in which an auxiliary moving shaft is rotationally assembled, and one end of the auxiliary moving shaft is in transmission connection with the main gear while the other end is in assembly connection with the double-sided brush head;

a bracket assembly, wherein the bracket assembly is rotationally assembled on the sliding rod, and both ends of the bracket assembly are movably connected with the adjacent main slewing arms and auxiliary slewing arms, respectively;

a crawling mechanism, wherein the crawling mechanism comprises a housing, a transverse guide slot, a moving rack, a rotating shaft, a lateral guide slot, a crimping wheel and a hinging rack, one end of the housing is fixedly connected with the hinging rack, and the housing is rotationally assembled at tail ends of the main slewing arm and the auxiliary slewing arm through the hinging rack, the transverse guide slot is arranged on two parallel end faces of the housing, the lateral guide slot is arranged on another two parallel end faces of the housing, the moving rack is elastically and slidingly assembled in the transverse guide slot, the rotating shaft is rotationally assembled on the moving rack, and the crimping wheel is fixedly assembled on the rotating shaft and movably arranged in the lateral guide slot; and a transmission assembly, wherein the transmission assembly comprises a first link arm, a first link, a second link arm and a second link, the first link arm is rotationally sleeved at a tail end of the rotating shaft, the first link is rotationally assembled on the first link arm, the second link is rotationally assembled on the main slewing arm and the auxiliary slewing arm, one end of the second link arm is rotationally sleeved on the first link while the other end is rotationally sleeved on the second link, the first link arm is also provided with a first synchronous belt group, which is in transmission connection with the rotating shaft and the first link, a second synchronous belt group is also arranged between the first link and the second link and in transmission connection with the first link and the second link, and the second link is in transmission connection with the main drive motor.

2. The crack detection apparatus for detecting the building structure according to claim 1, wherein the rack member further comprises linkage gears, the swing rod assembly further comprises a transmission plate, the linkage gears are rotationally assembled on the main slewing arms and the auxiliary slewing arms and arranged proximally to one end of the main shaft collar and one end of the auxiliary shaft collar, the transmission plate is fixedly assembled at one end of the rotating drum, a plurality of elastic ratchet sheets are arranged on the transmission plate in a circumferential direction, and the elastic ratchet sheets are in meshing connection with a plurality of linkage gears.

3. The crack detection apparatus for detecting the building structure according to claim 2, wherein the transmission assembly further comprises a third synchronous belt group, which is arranged between the second link and the linkage gears and configured to be in transmission connection with the linkage gears and the second link.

4. The crack detection apparatus for detecting the building structure according to claim 1, wherein the swing rod assembly further comprises an electrode rod, a middle-facing electrode sheet and a switching motor sheet, the electrode rod is assembled at one end of the rotating drum elastically and slidingly and connected with the middle-facing electrode sheet, both ends of the middle-facing electrode sheet are provided with the switching motor sheet, and both the middle-facing electrode sheet and the switching motor sheet are electrically connected with the main drive motor, to control a rotating direction of the main drive motor.

5. The crack detection apparatus for detecting the building structure according to claim 1, wherein the bracket assembly comprises a bracket body, a slideway, an upper sliding rod and a lower sliding rod, the bracket body is rotationally assembled at a tail end of the sliding rod, the slideway is arranged on the bracket body, the upper sliding rod and the lower sliding rod are slidingly assembled in the slideway, a bottom of the upper sliding rod is provided with an upper limiting body, a top of the lower sliding rod is provided with a lower limiting body, the upper limiting body is slidingly assembled in the lower limiting body, and the bracket body is also slidingly assembled with a detection device bracket.

6. The crack detection apparatus for detecting the building structure according to claim 5, wherein the bracket assembly further comprises transverse notches and transverse keys, both ends of the slideway are provided with the transverse notches, and both the upper sliding rod and the lower sliding rod are provided with the transverse keys, which are limited and slidingly assembled in the transverse notches.

7. The crack detection apparatus for detecting the building structure according to claim 1, wherein the crawling mechanism further comprises a rack, a transmission worm, a transmission worm gear and deflection rollers, the rack is fixedly arranged at one end of the moving rack, the transmission worm is rotationally assembled in the housing, one end of the transmission worm is in meshing connection with the rack while the other end is in meshing connection with the transmission worm gear, the transmission worm gear is rotationally assembled in the housing and both ends thereof are in assembly connection with the deflection rollers, and the deflection rollers are configured to prop the wall of the building structure in a rolling manner.

8. The crack detection apparatus for detecting the building structure according to claim 1, wherein the crawling mechanism further comprises an auxiliary drive motor, a limiting wheel rod and a limiting strip rod, the auxiliary drive motor is assembled at one end of the moving rack and in transmission connection with the rotating shaft, the limiting wheel rod is slidingly and rotationally assembled on the housing to prop the wall of the building structure in a rolling manner, and the limiting strip rod is slidingly assembled in the hinging rack to limit a rotating trajectory of two groups of housings on a same side.

9. The crack detection apparatus for detecting the building structure according to claim 1, wherein the crack detection apparatus for detecting the building structure further comprises a locking assembly, the locking assembly comprises arc-shaped arms, an arc-shaped arm limiter and a locking head, both two groups of arc-shaped arms are assembled on the adjacent main slewing arm and the auxiliary slewing arm in respective and slidingly assembled in the arc-shaped arm limiter, and one end of the arc-shaped arm limiter is also provided with the locking head, which is configured to movably lock the two groups of arc-shaped arms.

\* \* \* \* \*